Dec. 30, 1930.  A. ADDICKS  1,786,690
SAFETY DEVICE FOR VEHICLES PARTICULARLY POWER DRIVEN VEHICLES
Filed Jan. 31, 1929
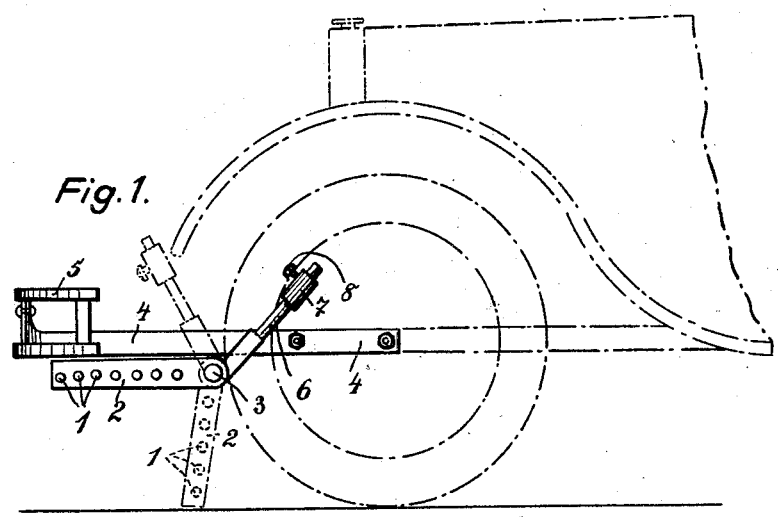
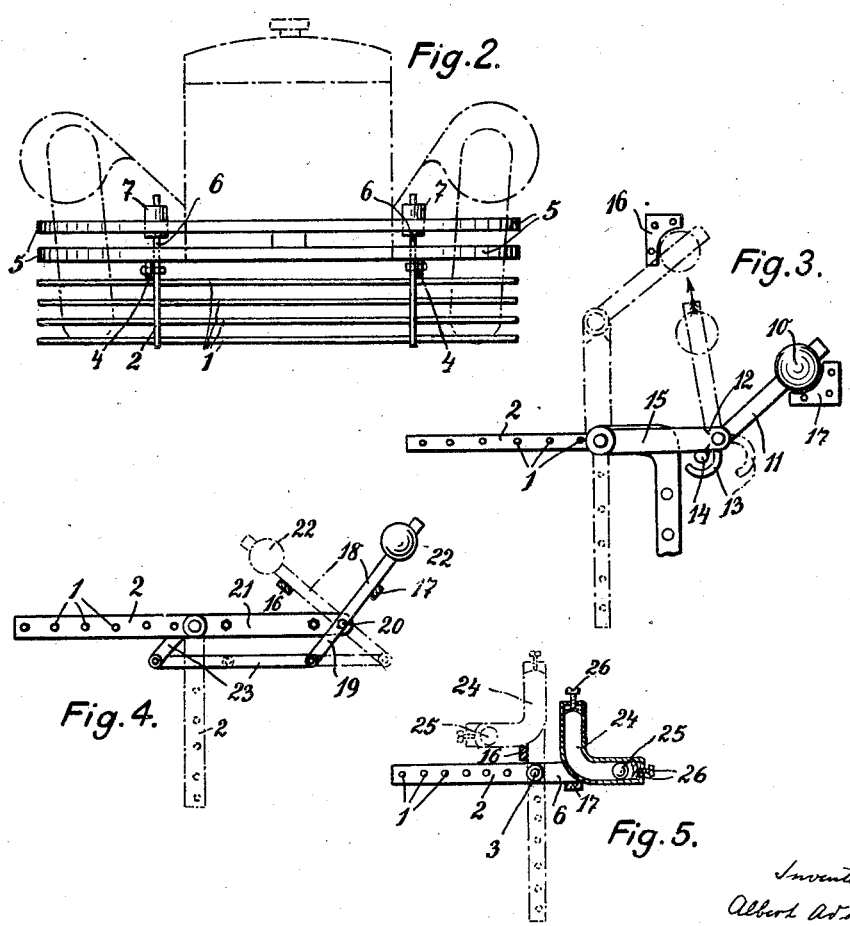

Patented Dec. 30, 1930

1,786,690

UNITED STATES PATENT OFFICE

ALBERT ADDICKS, OF BOITWARDEN, NEAR BRAKE, GERMANY

SAFETY DEVICE FOR VEHICLES, PARTICULARLY POWER-DRIVEN VEHICLES

Application filed January 31, 1929, Serial No. 336,482, and in Germany January 5, 1929.

Safety devices are known which are mounted in front of the vehicle wheels. These safety devices, particularly in the case of railroad and other rail vehicles, are rigidly mounted and only seldom fulfill their purpose, because they do not extend sufficiently far downwards. Such rigid catching racks or catching cages cannot be made to extend downward right to the upper surface of the track because the presence of irregularities thereon must be reckoned with or some kind of body, stones, projections or the like which may be present on the track. In the case of vehicles running on the roads, safety devices are known which are not rigid but are swivelly mounted and when not in action are folded, lifted or bent upward or occupy a position so that they neither detract from the appearance of the vehicle nor get in the way when the track is uneven or stones or the like are present thereon.

These latter safety devices are only brought into operative position when the necessity arises. This is effected either by hand or automatically. The throwing in by hand is uncertain as there is often insufficient time to carry out the necessary manipulations in the case of a person suddenly coming in front of the vehicle and naturally the driver in such cases just applies the brake to bring the vehicle to a standstill. Owing to these circumstances it has been proposed to do away with the operation by hand and to allow catching rack or cage to be operated automatically. With this object in view the brake of the vehicle is so arranged that, when moved to a certain degree, it releases the retaining means of the safety device, or this is effected by means of a forwardly extending releasing element, so that the safety device drops down under the action of gravity and e. g. picks up or pushes to one side the person lying on the track and prevents such person coming under the wheels. With this actuating method of the safety device the desired safe working is however not always attained, owing to the releasing not taking place quickly enough or the releasing not acting at all or too late. A further objection is also that these safety devices come into operation even when the brake is being applied for some other reason when it is not a question of protecting a person having come in front of the vehicle or through the releasing device striking against some object or other, and then the device can always only be brought back to its inoperative position by a special action.

The invention relates to an actuating device for such safety devices and it is therefore immaterial how these catching racks or catching baskets are themselves constructed. In this actuating device it is not necessary to release any special holding arrangement but it is always loose in position ready for immediate operation. This device is actuated by the alteration of the speed of the vehicle. At the braking this device is operated, without any special manipulation, merely by the sudden reduction in speed, and it rises again automatically, i. e. returns to its inoperative position, without any special manipulation, merely by the increased speed of the vehicle.

The idea of the invention consists in that these safety devices are connected with oscillating or otherwise actuated weight levers, that the inertia of this swinging pendulum which, on braking, swings forward and, when starting or at increasing of the running speed, backward, is utilized to bring these catching racks or cages from the inoperative position into the operative position or conversely. The throwing in of the device at the moment of danger is thus not dependent upon the releasing of the retaining mechanism, which mostly detrimentally affects the swinging down movement, and it is also not necessary to bring the dropped device back to its inoperative position, as this is carried out automatically when the vehicle again starts or increases its speed.

Safety devices actuated in this manner would considerably increase the running safety of all vehicles, railways, lorries, omnibuses, private cars, street cars and the like, i. e. of all conveyances because the driver of the vehicle is free from the actuation of the safety device. As the device is returned automatically to the inoperative position when the vehicle starts running, it will not be necessary to allow same to assume the operative position only when the brakes are being very strongly applied, but it can be adjusted so that it immediately assumes its operative position in the case of slight danger. The driver of the vehicle need not take any heed thereof, as the device swings back without his aid.

This operative arrangement of the safety rack or safety cage thus works not only more accurately and reliably than all other previous arrangements of the kind, but it also relieves the driver of the vehicle and consequently thereby greatly increases the safety of travel.

Several embodiments of the invention are shown by way of example in the accompanying drawing in which:

Fig. 1 is a side elevation of the safety device in conjunction with a known form of buffer, Fig. 2 is a front elevation of Fig. 1, Fig. 3 shows a special means of releasing the safety device, Fig. 4 represents a means of effecting the movement of the safety device through levers, and Fig. 5 shows the movement of the safety device, produced by the rolling of a ball in a bent tube.

The safety device consists of a known catching cage or catching rack composed of individual bars 1 which can be mutually connected by a wire net. These bars 1 in the construction shown by way of example are arranged in lever arms 2. According to Fig. 1 these lever arms 2 are oscillatably mounted on an axle 3 which is rotatably mounted on the retaining straps 4 of buffer bars 5. Each of the levers 2 forms a two-armed lever the rear arm 6 of which extends upwards at a suitable angle and is provided with a pendulum weight 7. This pendulum weight 7 can be shifted as desired on the lever 6 and is secured thereon by means of a retaining device 8. If the vehicle is sharply braked the pendulum weights 7 owing to their inertia swing upwards around their axle 3, until the lever arms 6 strike against a stop 9. Owing to this swinging movement of the lever arms 6 the lever arms 2 carrying the catching cage 1 are simultaneously brought down in front of the running wheels. Upon the vehicle starting or proceeding after braking the catching cage 1 automatically resumes its original position parallel to the track.

Fig. 3 shows a protecting device in which the safety cage is also brought into the operative position by means of pendulum weights. When the vehicle is being braked the pendulum weight 10 fitted to a pendulum arm 11 is thrown forward and caught by a stop 12. By this movement a retaining claw 13 is released which engages a retaining device 14 for the safety cage 1. Owing to the inertia of the pendulum, this will be swung upward around the lever arm 15 of the retaining element 2 for the safety cage, which is formed as a two-armed lever, until the pendulum presses against a stop in the form of a rubber buffer 16 or the like. When the pendulum is in this position the catching cage 1 is in a vertical position in front of the running wheels. In this form of construction the catching cage also returns to its initial position through the gravity of the pendulum. When in swung back position the pendulum weight 10 also rests on a rubber buffer 17. According to Fig. 4 the catching device is also brought into its operative position, i. e into a vertical position in front of the running wheels, by the inertia of a pendulum. In this form of construction a pendulum formed as a two-armed lever 18, 19 oscillating around an axle 20 arranged on a retaining bar 21. The lever arm 18 is provided at its outer end with a pendulum weight 22. When the vehicle is brought quickly to a standstill, this pendulum weight, through its inertia, is swung forward and moves the catching cage 1, 2 into its operative position by means of a lever system 23 hingedly connected to the lever arm 19. In this form of construction, as in the two previous arrangements, the catching device is also automatically returned into its raised position. The arrangement of the pendulum can also be in any desired form, thus it can consist, as shown in Fig. 5, of one or more tubes 24 bent to a certain angle in which a ball 25 of a certain weight rolls. The bent tube can be provided at both ends with an adjusting device 26. The arrangement of the lever system can be of any desired kind or situated under the device so that in the case of the brakes being suddenly applied the device will always be moved into its operative position through the inertia of the pendulum or ball, and the device, when the vehicle is at standstill or proceeds, will be moved into its raised position by the pendulum or the ball.

I claim:

1. A safety device for vehicles, specially power driven vehicles, comprising in combination a catching device oscillatably mounted under the vehicle frame in front of the two front wheels, and a counterweight device on the upper end of said catching device actuated by inertia when the vehicle is suddenly stopped or started.

2. A safety device for vehicles, specially power driven vehicles, comprising in combination an axle fixed under the vehicle frame in front of the front wheels, a catching device oscillatably mounted on said axle and consisting of a frame with transverse bars and of a wire net stretched over said frame, an arm rearwardly projecting at an angle from the top end of each side of said frame, and a heavy mass adjustably fixed on each arm near the free end of the same adapted to be actuated by inertia when the vehicle is suddenly stopped or started.

3. A safety device for vehicles, specially power driven vehicles, comprising in combination an axle fixed under the vehicle frame in front of the front wheels, a catching device oscillatably mounted on said axle and consisting of a frame with transverse bars and of a wire net stretched over said frame, an arm rearwardly projecting at an angle from the top end of each side of said frame, a heavy mass adjustably fixed on each arm near the free end of the same adapted to be actuated by inertia when the vehicle is suddenly stopped or started, and stops for the two extreme positions of said oscillatable arms.

4. A safety device for vehicles, specially power driven vehicles as specified in claim 1, comprising in combination with the catching device, two-armed levers one at each end of said catching device, and a heavy mass adjustably mounted on the rear arm of each lever.

5. A safety device for vehicles, specially power driven vehicles as specified in claim 1, comprising in combination with the catching device, two-armed levers one at each end of said catching device, a heavy mass adjustably mounted on the rear arm of each lever, a stop on the vehicle frame, and a hook on said two-armed lever adapted to grip over said stop when the corresponding pendulum lever is in the inoperative position and to disengage from said stop when the pendulum lever is oscillating at the braking.

6. In a safety device as specified in claim 1 comprising in combination with the pendulum lever and with the catching device, a pivot axle on said catching device, and means connecting said pendulum lever with said catching device consisting of a system of hinged levers hingedly mounted at the one end on said pendulum lever and at the other end on said pivot axle.

7. In a safety device as specified in claim 1, means for adjusting the heavy masses on the pendulum lever to any desired position.

8. In a safety device as specified in claim 1, the combination of an abutment with the catching device and of an abutment with the pendulum lever.

In testimony whereof I affix my signature.

ALBERT ADDICKS.